(12) United States Patent
Jeon et al.

(10) Patent No.: US 10,930,935 B2
(45) Date of Patent: Feb. 23, 2021

(54) ADDITIVE FOR CATHODE, METHOD FOR PREPARING THE SAME, CATHODE INCLUDING THE SAME, AND LITHIUM SECONDARY BATTERY INCLUDING THE SAME

(71) Applicant: LG Chem, Ltd., Seoul (KR)

(72) Inventors: Hyelim Jeon, Daejeon (KR); Donghun Lee, Daejeon (KR); Sang wook Lee, Daejeon (KR); Seul Ki Kim, Daejeon (KR); Eunsol Lho, Daejeon (KR); Wang Mo Jung, Daejeon (KR)

(73) Assignee: LG Chem, Ltd.

( * ) Notice: Subject to any disclaimer, the term of this patent is extended or adjusted under 35 U.S.C. 154(b) by 91 days.

(21) Appl. No.: 16/201,229

(22) Filed: Nov. 27, 2018

(65) Prior Publication Data

US 2019/0165377 A1 May 30, 2019

(30) Foreign Application Priority Data

Nov. 30, 2017 (KR) .......................... 10-2017-0163113
Oct. 18, 2018 (KR) .......................... 10-2018-0124562

(51) Int. Cl.
| | | |
|---|---|---|
| *H01M 4/62* | (2006.01) | |
| *H01M 4/525* | (2010.01) | |
| *H01M 10/0525* | (2010.01) | |
| *H01M 10/42* | (2006.01) | |
| *H01M 4/505* | (2010.01) | |
| *H01M 4/485* | (2010.01) | |
| *H01M 4/36* | (2006.01) | |

(Continued)

(52) U.S. Cl.
CPC ............ *H01M 4/628* (2013.01); *H01M 4/364* (2013.01); *H01M 4/485* (2013.01); *H01M 4/505* (2013.01); *H01M 4/525* (2013.01); *H01M 4/5825* (2013.01); *H01M 10/0525* (2013.01); *H01M 10/4235* (2013.01); *H01M 2004/028* (2013.01)

(58) Field of Classification Search
CPC ...... H01M 4/628; H01M 4/364; H01M 4/485; H01M 4/505; H01M 4/525; H01M 4/5825; H01M 10/0525; H01M 10/4235; H01M 2004/028
USPC ........................................................ 429/209
See application file for complete search history.

(56) References Cited

U.S. PATENT DOCUMENTS

| | | | | |
|---|---|---|---|---|
| 2010/0266899 | A1* | 10/2010 | Barker ................. | H01M 4/582 429/221 |
| 2013/0171524 | A1* | 7/2013 | Cho ....................... | H01M 4/364 429/221 |

(Continued)

FOREIGN PATENT DOCUMENTS

| | | |
|---|---|---|
| JP | 2004-079386 A | 3/2004 |
| JP | 6194235 B2 | 9/2017 |

(Continued)

*Primary Examiner* — Milton I Cano
*Assistant Examiner* — Suphia Quraishi
(74) *Attorney, Agent, or Firm* — Lerner, David, Littenberg, Krumholz & Mentlik, LLP (57) ABSTRACT

Disclosed are a cathode additive of a lithium secondary battery which may have improved crystallinity and a method for preparing the same. The cathode additive may be provided to suppress generation of oxygen gas or gelation of an electrode slurry composition, which may occur due to reduction in the content of residual by-products containing lithium oxide.

5 Claims, 6 Drawing Sheets

(51) Int. Cl.
*H01M 4/58* (2010.01)
*H01M 4/02* (2006.01)

(56) References Cited

U.S. PATENT DOCUMENTS

| | | | | |
|---|---|---|---|---|
| 2015/0004472 A1* | 1/2015 | Thackeray | ............ | H01M 4/366 |
| | | | | 429/158 |
| 2015/0064577 A1* | 3/2015 | Natsui | ............... | H01M 10/0569 |
| | | | | 429/338 |
| 2015/0243936 A1* | 8/2015 | Miyagi | ............... | H01M 4/1391 |
| | | | | 429/94 |
| 2015/0372304 A1* | 12/2015 | Hasegawa | ........... | H01M 4/1391 |
| | | | | 429/231.95 |
| 2016/0218394 A1* | 7/2016 | Yamada | .................. | H01G 11/62 |
| 2016/0351905 A1* | 12/2016 | Kawamura | ........... | H01M 4/505 |
| 2016/0372784 A1* | 12/2016 | Hayner | ............... | H01M 4/5825 |
| 2017/0207449 A1* | 7/2017 | Kang | .................... | H01M 4/582 |
| 2017/0317337 A1* | 11/2017 | Hayashi | .................. | C01B 17/22 |
| 2017/0352914 A1 | 12/2017 | Awano et al. | | |
| 2018/0197691 A1* | 7/2018 | Song | ...................... | C01G 51/42 |

FOREIGN PATENT DOCUMENTS

| | | | | | |
|---|---|---|---|---|---|
| KR | 20160026402 A | * | 3/2016 | | |
| KR | 10-2016-0039983 A | | 4/2016 | | |
| KR | 20170003209 A | * | 1/2017 | ............. | C01D 15/00 |
| KR | 10-2017-0100529 A | | 9/2017 | | |

\* cited by examiner

FIG. 1

RELATED ART

ADDITIVE FOR CATHODE, METHOD FOR PREPARING THE SAME, CATHODE INCLUDING THE SAME, AND LITHIUM SECONDARY BATTERY INCLUDING THE SAME

CROSS-REFERENCE TO RELATED APPLICATION(S)

This application claims the benefit of Korean Patent Application No. 10-2017-0163113 filed on Nov. 30, 2017 and Korean Patent Application No. 10-2018-0124562 filed on Oct. 18, 2018, which applications are incorporated herein by reference in their entirety.

TECHNICAL FIELD

The present invention relates to a cathode additive of a lithium secondary battery having improved crystallinity, a method for preparing the same, a cathode, and a lithium secondary battery including the same. The cathode additive may suppress generation of oxygen gas or gelation of an electrode slurry composition that may occur due to reduction in the content of residual by-products containing lithium oxide.

BACKGROUND

Recently, demand for secondary batteries as an energy source has become rapidly growing. Among the secondary batteries, lithium secondary batteries having high energy density and voltage, long cycle life and low self discharge rate have been commercialized and widely used.

Although graphite is mainly used as an anode material of the lithium secondary battery, it is difficult to increase the capacity of the lithium secondary battery, since the capacity per unit mass of the graphite is as small as 372 mAh/g. Accordingly, an anode material for forming an intermetallic compound with lithium, such as silicon, tin and oxides thereof, has been developed and used as a non-carbon anode material having an energy density higher than that of graphite in order to increase the capacity of the lithium secondary battery. However, although the non-carbon anode material has high capacity, an initial efficiency is low, which causes a large lithium consumption during the initial charge-discharge, and a large irreversible capacity loss.

In the related arts, a method of overcoming the irreversible capacity loss of the anode using a material which can provide a lithium ion source or a storage material to the cathode material and which exhibits electrochemical activity after the first cycle so as not to deteriorate the performance of the entire battery has been studied and proposed. For instance, an oxide containing an excessive amount of lithium such as $Li_6CoO_4$ has been applied as a sacrificial cathode material or an irreversible additive (or an overdischarge-preventing agent) to the cathode.

Figure 1:
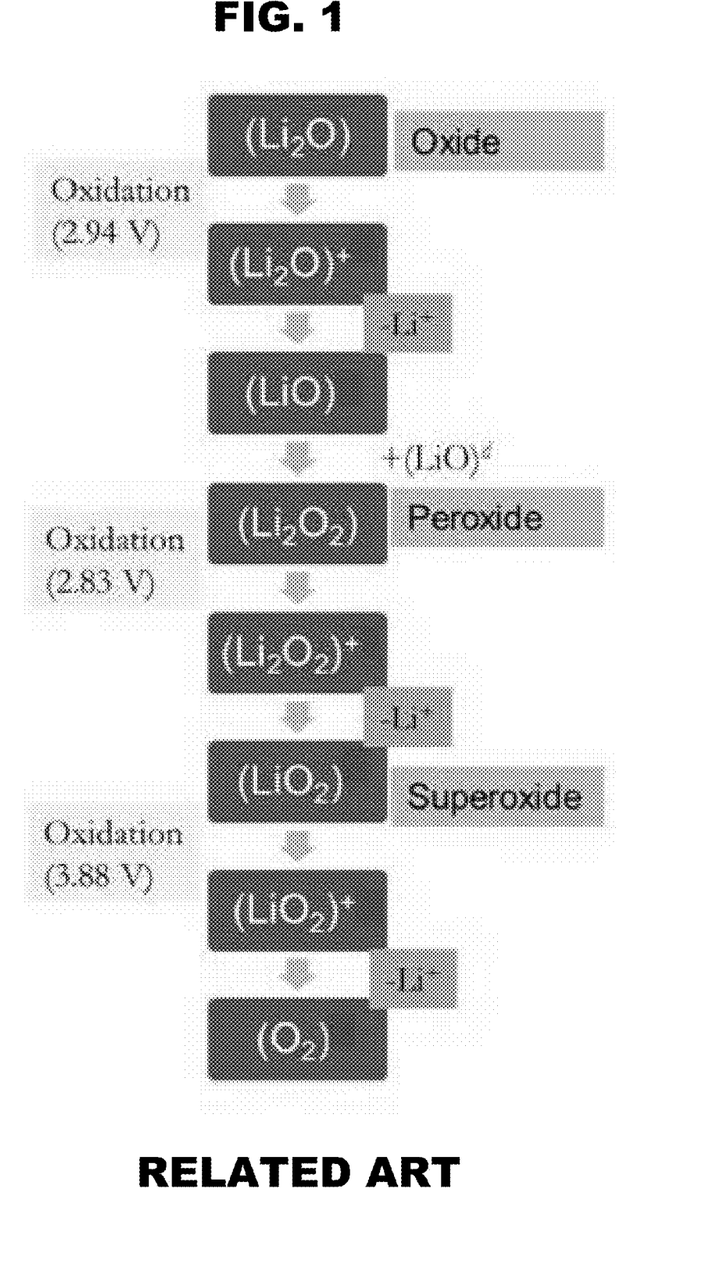
FIG. 1 is a diagram schematically showing a mechanism by which oxygen gas is generated from unreacted lithium oxide in a conventional irreversible cathode additive.

However, existing irreversible additives such as $Li_6CoO_4$ have been generally prepared by reacting a cobalt precursor such as cobalt oxide or hydroxide with an excess amount of lithium oxide. At this time, by-products such as unreacted lithium oxide ($Li_2O$) not participating in the reaction may remain in the finally produced irreversible additive, which can cause oxidation in a charging-discharging process to generate oxygen gas inside the battery. For instance, FIG. 1 schematically shows a mechanism by which oxygen gas is generated from unreacted lithium oxide. The oxygen gas thus generated may cause volume expansion and the like, which may be one of the main factors causing deterioration of the battery performance.

In addition, the by-products such as lithium oxide may react with a binder component and the like in the preparation of a slurry composition for forming an electrode to cause increase in viscosity or gelation of the composition, and may cause decrease in crystallinity of the irreversible cathode additive and the cathode active material. As a result, it is difficult to uniformly apply the electrode composition for forming an active material layer, and characteristics of the battery may be deteriorated.

Due to the above-mentioned problems, there is a continuing need for development of an irreversible cathode additive exhibiting improved crystallinity and characteristics while having a small residual amount of by-products such as lithium oxide.

SUMMARY OF THE INVENTION

Provided are, inter alia, a cathode additive for a lithium secondary battery and a method for preparing the same. The cathode additive of the present invention may suppress generation of oxygen gas or gelation of an electrode slurry composition due to a small residual amount of by-products such as lithium oxide while exhibiting improved crystallinity. Further, provided are a cathode including the cathode additive, a lithium secondary battery including the cathode additive capable. The lithium secondary battery may overcome the irreversible capacity loss of the anode material and solve problems caused by residual by-products in the cathode additive, even with use of the anode material having high energy density.

In one aspect, provided is a cathode additive for a lithium secondary battery. The cathode additive may include a composite including ($Li_6Co_{1-x}M_xO_4$) and ($Li_aM_bO_c$), wherein M includes one or more elements selected from the group consisting of P, B, F, W, and Zr; $0.1 \leq a \leq 6$, $1 \leq b \leq 5$ $1 \leq c \leq 8$; and $0 \leq x < 1.0$.

The "composite" as used herein refers to a material (e.g., solid material) including two or more components having different or separate characteristics such as chemical formula, shape, components, structure, phase, or physical properties. In certain embodiments, the composite may include two or more components that are physically or chemically attached or bound to each other. In certain embodiments, the composite may include two or more components that are mixed or admixed, aggregated, or co-precipitated.

The composite may be represented by the following Chemical Formula 1:

$$y(Li_6Co_{1-x}M_xO_4)\text{-}z(Li_aM_bO_c). \qquad \text{[Chemical Formula 1]}$$

In Chemical Formula 1, y and z are molar ratios of $Li_6Co_{1-x}M_xO_4$ and $Li_aM_bO_c$ contained in the composite of Chemical Formula 1, and y:z is 2:1 to 60:1, and each of a, b and c is independently an integer of 1 or more, and is determined within a range satisfying the following Equation 1:

$$(\text{oxidation number of Li} \times a) + (\text{oxidation number of element M} \times b) + (\text{oxidation number of O} \times c) = 0. \quad \text{[Equation 1]}$$

Preferably, the composite may include the $Li_6Co_{1-x}M_xO_4$ and the $Li_aM_bO_c$ physically mixed and attached to each other. In addition, the composite may be present in a form of a single particulate or a complex.

The term "particulate" as used herein refers to a separate and distinct particle that may include other particles having smaller size (sub-particles) in aggregated forms, without particularly limitation in sizes, shapes, arrangement or weights thereof. In certain embodiments, the particulate may be formed of sub-particles in a random mixture or aggregated form.

Preferably, the composite may have a second peak at 2θ of 22.42±0.5°, 24.84±0.5° or 34.88±0.5° in XRD (X-ray diffraction) analysis by Cu Kα X-ray (X-rα). An intensity of the second peak may suitably be about 10% or less based on an intensity of a first peak at 2θ of 23.5±0.5°.

Preferably, the composite may further include $Li_2O$ in an amount of about 5 wt % or less based on the total amount of the composite.

In another aspect, provided is a method for preparing the cathode additive of a lithium secondary battery as described herein. The method may include: a first calcination step including calcining a mixture including a cobalt precursor, and a lithium precursor including $Li_2O$ under an inert atmosphere at a temperature of about 400 to 800° C.

The mixture of the first calcinating step may further include an M-containing precursor. Preferably, a complex including $Li_6Co_{1-x}M_xO_4$ and $Li_2O$ may be formed after the first calcinating step.

The first calcination step may suitably be performed at a temperature of about 500 to 800° C.

The method may further include a second calcination step including calcining and further reacting the lithium precursor and the M-containing precursor contained in the complex under an inert atmosphere at a temperature of 400° C. or more and lower than 700° C. For example, the second calcination step may suitably be performed at a temperature of about 440 to 680° C.

Thus, the cathode additive prepared by the method may include a composite represented by the following Chemical Formula 1:

$$y(Li_6Co_{1-x}M_xO_4)\text{-}z(Li_aM_bO_c) \quad \text{[Chemical Formula 1]}$$

wherein M includes one or more elements selected from the group consisting of P, B, F, W, and Zr;

$$0.1 \leq a \leq 6,\ 1 \leq b \leq 5\ 1 \leq c \leq 8;$$

$0 \leq x < 1.0$, and y and z are molar ratios of $Li_6Co_{1-x}M_xO_4$ and $Li_aM_bO_c$ contained in the composite of Chemical Formula 1, and y:z is about 2:1 to 60:1, each of a, b and c is independently an integer of 1 or more, and is determined within a range satisfying the following Equation 1:

(oxidation number of Li×a)+(oxidation number of element M×b)+(oxidation number of O×c)=0. [Equation 1]

The cobalt precursor may suitably include one or more selected from the group consisting of cobalt oxide, cobalt hydroxide, cobalt oxyhydroxide, cobalt sulfate, cobalt nitrate, cobalt acetate, cobalt carbonate, cobalt oxalate, cobalt citrate, cobalt halide, cobalt phosphate, and hydrate thereof. The M-containing precursor may suitably include an element M, or one or more selected from the group consisting of its oxide, hydroxide, oxyhydroxide, sulfate, nitrate, acetate, carbonate, oxalate, citrate, halide, phosphate and hydrate thereof.

In another aspect, provided is a method for preparing a cathode additive of a lithium secondary battery as described herein. The method may include a first calcination step comprising calcining a mixture comprising a cobalt precursor, an M-containing precursor and a lithium precursor comprising $Li_2O$ under an inert atmosphere at a temperature of about 400 to 800° C. to form a complex comprising $Li_6Co_{1-x}M_xO_4$ and $Li_2O$; and a second calcination step comprising calcining and further reacting the lithium precursor and the M-containing precursor remained in the complex under an inert atmosphere at a temperature of about 400° C. or greater and less than about 700° C.

Further provided is a cathode mix including the cathode additive as described herein; and a cathode active material. Preferably, a weight ratio of the cathode additive:the cathode active material may suitably be about 1:99 to 35:65. The cathode active material may suitably include i) one or more selected from the group consisting of composite oxides of a metal of cobalt, manganese, and nickel; and ii) lithium.

Also provided is a lithium secondary battery including: a cathode including the cathode mix as described herein; an electrolyte; and an anode.

Other aspect of the invention are disclosed infra.

DETAILED DESCRIPTION

Hereinafter, the cathode additive according to the embodiment of the present invention, the method for preparing the same, and the like will be described in detail. Unless otherwise defined in this specification, all the technical and scientific terms used herein have the same meanings as what are generally understood by a person skilled in the related art to which the present invention belongs. Therefore, repeated descriptions of the same technical configurations and operations as in the prior art are omitted for clarity.

As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

In this disclosure, the term "about or approximately" or "substantially" is intended to have meanings close to numerical values or ranges specified with an allowable error and intended to prevent accurate or absolute numerical values disclosed for understanding of the present invention from being illegally or unfairly used by any unconscionable third party.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In an aspect, provided is a cathode additive for a lithium secondary battery. The cathode additive may include a composite including ($Li_6Co_{1-x}M_xO_4$) and ($Li_aM_bO_c$), wherein M includes one or more elements selected from the group consisting of P, B, F, W, and Zr; $0.1 \leq a \leq 6$, $1 \leq b \leq 5$ $1 \leq c \leq 8$; and $0 \leq x < 1.0$. Preferably, the composite may represented by the following Chemical Formula 1, is provided:

$$y(Li_6Co_{1-x}M_xO_4)\text{-}z(Li_aM_bO_c). \quad \text{[Chemical Formula 1]}$$

Preferably, y and z are molar ratios of $Li_6Co_{1-x}M_xO_4$ and $Li_aM_bO_c$ contained in the composite of Chemical Formula 1, and y:z is 2:1 to 60:1.

Moreover, each of a, b and c is independently an integer of 1 or greater, and is determined within a range satisfying the following Equation 1:

$$\text{(oxidation number of Li} \times a) + \text{(oxidation number of element M} \times b) + \text{(oxidation number of O} \times c) = 0. \quad \text{[Equation 1]}$$

each of x, y and z is independently an integer of 1 or greater, and is determined within a range The cathode additive may include a novel composite or complex. The composite may be prepared by forming $Li_6Co_{1-x}M_xO_4$, which can act as an irreversible additive, and then further calcining/reacting by-products such as unreacted lithium oxide ($Li_2O$) with the M-containing precursor. This novel composite or complex may suitably include $Li_6Co_{1-x}M_xO_4$ and $Li_aM_bO_c$ formed by additionally reacting the lithium oxide and the M-containing precursor, and optionally lithium oxide ($Li_2O$) in a trace residual amount or non-residual amount. The composite may be in the form of a single particulate or a composite.

The "a single particulate or a composite" is meant by a particle ("secondary particle") that may be formed by particles ("primary particle(s)") of each component. For example, the single particulate may be formed by the particles of each component physically mixed and/or attached (e.g., connected) connected to each other and exist as an aggregated single particulate such as a secondary particle. Preferably, the primary particles of the components (e.g., $Li_6Co_{1-x}M_xO_4$ and $Li_aM_bO_c$) may be simply mixed, which is not in a form of an aggregated single particle. For example, each of the components (e.g., $Li_6Co_{1-x}M_xO_4$ and $Li_aM_bO_c$) may be separately prepared and mixed.

The cathode additive of the embodiment may have reduced by-products, i.e., a residual amount of lithium oxide ($Li_2O$), compared with previously known irreversible cathode additives, such as $Li_6CoO_4$. For example, the compound of Chemical Formula 1 may further contain residual $Li_2O$ in an amount of about 5 wt % or less, 0 to 5 wt %, about 0.0001 to 4 wt %, or particularly of about 0.1 to 3 wt %, based on the total weight of the composite.

Preferably, the residual amount of by-products may be reduced due to the additional reaction of lithium oxide. As a result, the cathode additive may significantly reduce generation of oxygen gas in the battery or gelation of an electrode slurry composition due to by-products of the lithium oxide.

Furthermore, because $Li_aM_bO_c$ is formed by the additional reaction of the lithium oxide, by-products content is reduced, and the content of M is increased, the cathode additive and the cathode mix including the same may exhibit improved crystallinity. Therefore, the cathode additive may have improved crystallinity while minimizing problems caused by by-products, and may be preferably used for a high capacity lithium secondary battery as it provides high irreversible capacity in response to high capacity of an anode material.

Figure 2:
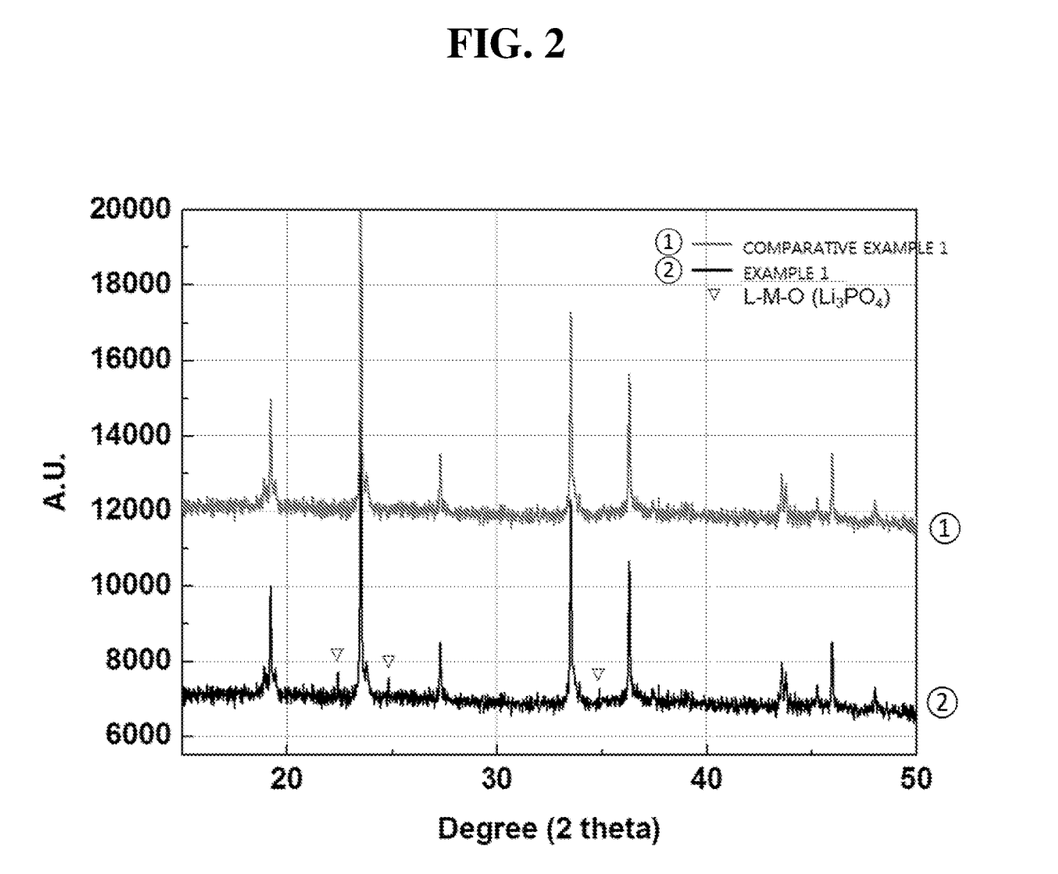
FIG. 2 is a graph showing XRD analysis results of an exemplary cathode additives obtained in Example 1 according to an exemplary embodiment of the present invention and Comparative Example 1.

The cathode additive may have $Li_6Co_{1-x}M_xO_4$ and $Li_aM_bO_c$ in the form of a single particulate or a complex, which may be confirmed by XRD (X-Ray Diffraction) analyzing the cathode additive in the form of a single secondary particle using Cu Kα X-ray (X-rα). For instance, an example of the XRD analysis result is shown in FIG. 2. In particular, the XRD analysis result (the graph at the bottom of FIG. 2) of an exemplary cathode additive may have a peak derived from $Li_aM_bO_c$, for example, a peak at 2θ of 22.42°±0.5°, 24.84±0.5° or 34.88±0.5. In comparison, the XRD analysis result (the graph at the top of FIG. 2) shows that a conventional irreversible cathode additive of the following Chemical Formula 2, for example, $Li_6CoO_4$ includes a considerable amount of lithium oxide ($Li_2O$) as a by-product.

$$Li_6Co_{1-x}M_xO_4 \quad \text{[Chemical Formula 2]}$$

In Chemical Formula 2, M and x are as defined in Chemical Formula 1.

The peak confirmed at 2θ of 22.42°±0.5°, 24.84±0.5°, or 34.88±0.5° may have an intensity of about 10% or less, greater than 0 and about 10% or less, about 1 to 10%, about 2 to 7%, or particularly about 5 to 6%, based on an intensity of the peak derived from the compound of Chemical Formula 2, for example, a peak at 2θ of 23.5°±0.2°.

Also, the content of $Li_aM_bO_c$ contained in the cathode additive, for example, a molar ratio of $Li_6Co_{1-x}M_xO_4$ and $Li_aM_bO_c$ contained in Chemical Formula 1, or particularly, a molar ratio of y:z may be calculated by analyzing a relative intensity of the peak.

The compound of Chemical Formula 1 included in the cathode additive of the embodiment may have $Li_6Co_{1-x}M_xO_4$ and $Li_aM_bO_c$ in a molar ratio y:z of about 2:1 to 60:1, 5:1 to 50:1, or 7:1 to 30:1. For instance, specific contents of these two components may be calculated from a remaining content excluding a trace amount of $Li_2O$, and the molar ratio of y:z above. The calculated $Li_aM_bO_c$ content may be about 1.5 wt % or less, or about 0.1 to 1.5 wt %, based on a total weight of the cathode additive.

By satisfying the content range of each component, various exemplary cathode additive may be prepared easily and effectively, and may reduce generation of oxygen gas or gelation of an electrode slurry composition due to by-products of the lithium oxide, while exhibiting improved crystallinity.

Meanwhile, in the cathode additive of Chemical Formula 1, the element M may improve thermal stability and structural stability by substituting a part of nickel or cobalt of each component. The element M may suitably include one or more metal elements and amphoteric elements. Preferably, the element M may suitably include one or more selected from the group consisting of a metal element such as W or Zr; P, F and B. Preferably, the M element may suitably include P or B which is excellent in reactivity with lithium and capable of forming a more stable composite.

This element M may be added in a ratio that x is 0 or greater, less than 1, of about 0 to 0.6, of about 0.001 to 0.5, or particularly of about 0.01 to 0.4, by substituting a part of cobalt of $Li_6Co_{1-x}M_xO_4$ of Chemical Formula 1. By satisfying the substitution ratio, stability of the composite for the cathode additive of Chemical Formula 1 may be improved, and the cathode additive of the Chemical Formula 1 may provide excellent irreversible capacity and the like.

In addition, $Li_aM_bO_c$ may include Li, the element M and O in a molar ratio of a, b and c, respectively. With satisfying the Equation 1, it may have $0.1 \le a \le 6$, $1 \le b \le 5$ and $1 \le c \le 8$.

The cathode additive may be mixed with a separate cathode active material and used as an irreversible cathode additive. In addition, the cathode additive may act as a cathode active material in itself after serving as an irreversible additive by providing excessive lithium ions in the initial charge-discharge process. Because, the cathode additive of the embodiment may have improved crystallinity and the residual amount of by-products of lithium oxide is greatly reduced, deterioration of battery performance, which may occur due to generation of oxygen gas, or gelation of an electrode slurry composition, may be suppressed.

In another aspect, provided is a method for preparing the above-described cathode additive. The method may suitably include a first calcination step including calcining a mixture including a cobalt precursor and a lithium precursor containing $Li_2O$ under an inert atmosphere at a temperature of about 400 to 800° C. to form a complex containing $Li_6Co_{1-x}M_xO_4$ and $Li_2O$. The mixture may further include an M-containing precursor. By including the M-containing precursor, after the first calcinating step, a complex including $Li_6Co_{1-x}M_xO_4$ and $Li_2O$ may suitably be formed. The method may further include a second calcination step including calcining and further reacting the lithium precursor and the M-containing precursor (e.g., residues or by-product contained in the complex) under an inert atmosphere at a temperature of about 400° C. or greater and less than about 700° C. to form the compound represented by the Chemical formula 1.

For example, a cobalt precursor, a lithium precursor including $Li_2O$, and optionally an M-containing precursor may be first calcined and reacted to form $Li_6Co_{1-x}M_xO_4$ as $Li_2O$ may be included as an unreacted residual product), and then the lithium precursor such as lithium oxide ($Li_2O$) contained therein may be further reacted (the secondary calcination) with the M-containing precursor which may be left from the first calcination step or additionally added.

As a result, the lithium precursor containing the unreacted lithium oxide may be consumed, and $Li_aM_bO_c$ is formed by the reaction with the M-containing precursor, so that the cathode additive including the composite of Chemical Formula 1 may suitably be obtained.

Preferably, the first calcination step may be performed under an inert atmosphere at a temperature of about 400 to 800° C., or particularly about 500 to 800° C., and the second calcination step may suitably be performed under an inert atmosphere at a temperature of about 400° C. or greater and about 700° C. or less, or particularly of about 440 to 680° C.

As the first calcination step may be performed under these reaction conditions, $Li_6Co_{1-x}M_xO_4$ may suitably be formed with a high yield. Additionally, as the second calcination step may be performed under these reaction conditions, for example, at a temperature of about 700° C. or less, form $Li_aM_bO_c$ may be sufficiently formed and the cathode additive may include the composite in the form of a single complex or the like without causing decomposition of the preformed $Li_6Co_{1-x}M_xO_4$. When the second calcination temperature is greater than the predetermined temperature, for example, greater than about 700° C. or only the first calcination step is performed at high temperature, $Li_6Co_{1-x}M_xO_4$ may be decomposed, or $Li_aM_bO_c$ may not be formed properly, so that the cathode additive may not properly be formed in a single complex.

The first and second calcination steps may be suitably carried out under an inert gas atmosphere such as nitrogen, helium, or argon to reduce side reactions. Preferably, the inert gas atmosphere may include a nitrogen gas atmosphere ton increase in reaction efficiency and reduce side reactions.

The cobalt precursor may suitably include one or more selected from the group consisting of cobalt oxide such as CoO, cobalt hydroxide such as $Co(OH)_2$, cobalt oxyhydroxide, cobalt sulfate, cobalt nitrate, cobalt acetate, cobalt carbonate, cobalt oxalate, cobalt citrate, cobalt halide, cobalt phosphate, and hydrate thereof. Specific examples thereof include CoO, $Co_3O_4$, $Co(OH)_2$, $Co(OH)_3$, and $Co(NO_3)_2 \cdot xH_2O (1 \le x \le 7)$, $Co(COOCH_3)_2$.

In addition, the lithium precursor may further include another lithium precursor in addition to the above-described lithium oxide ($Li_2O$). However, since $Li_2Ni_{1-x}M_xO_2$ is unstable, the usable lithium precursor may be a compound having high reactivity similar to the lithium oxide ($Li_2O$).

The M-containing precursor may suitably include an element M. Further, the M-containing precursor may suitably include one or more selected from the group consisting of its oxide, hydroxide, oxyhydroxide, sulfate, nitrate, acetate, carbonate, oxalate, citrate, halide, phosphate and hydrate of the element M (e.g., Ni, W, Mg, Ti, Zr, Al; P, F and B).

The lithium precursor, the cobalt precursor and the M-containing precursor may suitably be selected and used by those skilled in the art in such an amount as to satisfy a composition ratio of each element of the Chemical Formula 1 to be finally prepared.

A sintering agent may be optionally added in the mixing of the raw materials (e.g., precursors) described above. The sintering agent may suitably include a compound containing an ammonium ion such as $NH_4F$, $NH_4NO_3$, and $(NH_4)_2SO_4$; a metal oxide such as $B_2O_3$ and $Bi_2O_3$; or a metal halide such as $NiCl_2$ and $CaCl_2$, or a mixture of two or more thereof. The sintering agent may be used in an amount of about 0.01 to 0.2 mol based on 1 mol of the cobalt precursor. When it is used within the above range, sintering property may be sufficiently improved, thereby improving the performance of the cathode material and preventing reduction of the initial capacity of the battery during a charge-discharge process.

In addition, a moisture removing agent may be optionally added in the mixing of the raw materials (e.g., precursors) described above. The moisture removing agent may suitably include one or more of citric acid, tartaric acid, glycolic acid, and maleic acid. The moisture removing agent may be used in an amount of about 0.01 to 0.2 mol based on 1 mol of the cobalt precursor.

In another aspect of the present invention, provided is a cathode mix including the above-described cathode additive and a cathode active material.

Since the cathode additive of the embodiment is applied to the cathode mix, an initial irreversible capacity of the anode may be reduced compared to a conventional cathode without the cathode additive of the present invention, thereby increasing an initial efficiency of the cathode.

The cathode mix may suitably include the cathode additive: the cathode active material at a weight ratio of the cathode additive:the cathode active material may be of about 1:99 to 35:65, about 3:97 to 30:70, or particularly about 5:95 to 10:90. Within the above range, a synergistic effect of each component may be displayed.

when the cathode additive and the cathode active material are mixed in the above range, the initial irreversible capacity of the anode may be sufficiently reduced by the cathode additive in the initial charge-discharge (for example, in the first cycle) of the battery, and then reversible insertion and desorption of lithium ions may be stably performed by the cathode active material in the subsequent charge-discharge (for example, after the second cycle).

The cathode mix of the embodiment may be prepared by methods well-known in the art.

The cathode active material as used herein refers to a material capable of reversible insertion and desorption of lithium ions. For example, it may suitably include i) one or more oxide of a metal of cobalt, manganese, and nickel; and ii) lithium.

For example, the cathode active material may be one or more compounds represented by the following formulae: $Li_aA_{1-b}R_bD_2$ (wherein, $0.90 \leq a \leq 1.8$ and $0 \leq b \leq 0.5$); $Li_aE_{1-b}R_bO_{2-c}D_c$ (wherein, $0.90 \leq a \leq 1.8$, $0 \leq b \leq 0.5$, and $0 \leq c \leq 0.05$); $LiE_{2-b}R_bO_{4-c}D_c$ (wherein, $0 \leq b \leq 0.5$, $0 \leq c \leq 0.05$); $Li_aNi_{1-b-c}Co_bR_cD_\alpha$ (wherein, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_\alpha$ (wherein, $0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ (wherein, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein, $0.90 \leq a \leq 1.8$, $0 \leq b \leq 0.5$, $0 \leq c \leq 0.05$ and $0 < \alpha < 2$); $Li_aNi_bE_cG_dO_2$ (wherein, $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, $0.90 \leq a \leq 1.8$ and $0.001 \leq b \leq 0.1$); $Li_aCoG_bO_2$ (wherein, $0.90 \leq a \leq 1.8$ and $0.001 \leq b \leq 0.1$); $Li_aMnG_bO_2$ (wherein, $0.90 \leq a \leq 1.8$ and $0.001 \leq b \leq 0.1$); $Li_aMn_2G_bO_4$ (wherein, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A may be Ni, Co, Mn, or a combination thereof; R may be Al, Ni, Co, Mn, Cr, Fe, Mg, Sr, V, a rare earth element, or a combination thereof; D may be O, F, S, P, or a combination thereof; E may be Co, Mn, or a combination thereof; Z may be F, S, P, or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; J may be V, Cr, Mn, Co, Ni, Cu, or a combination thereof.

The cathode additive composite, which may be formed in a particulate, may include a coating layer on its surface. The cathode additive composite may be used after mixing with a compound (e.g., coating material) having a coating layer. The coating layer may suitably include the coating material such as include oxide, hydroxide, oxyhydroxide, oxycarbonate, and hydroxycarbonate of the coating material. The compound for the coating layer may be amorphous or crystalline. The coating material for the coating layer may suitably include one or more selected from the group consisting of Mg, Al, Co, K, Na, Ca, Si, Ti, V, Sn, Ge, Ga, B, As, and Zr. The coating layer may be formed using any method that does not adversely affect the physical properties of the cathode active material (for example, a spray coating method or a dipping method), when the cathode additive includes the above coating element. The coating methods may be well understood by those skilled in the art, and thus a detailed description thereof will be omitted.

The cathode mix may further include a conductive material, a binder, or a mixture thereof. The conductive material may improve conductivity of the electrode. The conductive material may have has electrical conductivity without causing chemical changes in the battery. Examples of the conductive material may suitably natural graphite, artificial graphite, carbon black, acetylene black, ketjen black, carbon fiber, metallic powders such as copper powder, nickel powder, aluminum powder and silver powder, metal fiber, and the like, and conductive materials such as polyphenylene derivatives may be used alone or in combination thereof.

The binder as used herein refers to a material for binding the cathode active material particles to each other and to attach the cathode active material to the current collector. Representative examples thereof may suitably include polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin and nylon, but are not limited thereto.

Further provided is a lithium secondary battery including a cathode including the above-described cathode mix; an electrolyte; and an anode.

Because the lithium secondary battery has the cathode including the cathode additive and the cathode active material, the initial irreversible capacity of the anode may decrease, the initial efficiency of the cathode may increase, performance deterioration due to oxygen gas during the operation may not occur, and the energy density may not be deteriorated, thereby exhibiting excellent lifetime characteristics.

The lithium secondary battery of the embodiment can be generally prepared (e.g., assembled) according to those well-known in the art. Hereinafter, generally known in the art is briefly mentioned, but this is merely an example, whereby the cathode mix of the above embodiment is not limited.

The cathode may include a cathode current collector; and a cathode mix layer disposed on the cathode current collector and including the cathode mix described above.

The cathode may be prepared by applying an electrode mix, which is a mixture of a cathode active material, a conductive material, and/or a binder, on a cathode current collector, followed by drying. A filler may be further added to the mixture.

The cathode current collector may suitably be formed to have a thickness of about 3 to 500 μm. The cathode current collector is not particularly limited as long as it has high electrical conductivity without causing chemical changes in the battery. For example, the cathode current collector may suitably include stainless steel; aluminum; nickel; titan; sintered carbon; aluminum or stainless steel surface-treated with carbon, nickel, titan or silver; or the like. The current collector may form fine irregularities on its surface to increase adhesive force of the cathode active material, and various forms such as a film, a sheet, a foil, a net, a porous body, a foam body, and a nonwoven fabric body may be used.

The conductive material may suitably be added in an amount of about 1 to 50 wt % based on a total weight of the mixture including the cathode active material. The conductive material is not particularly limited as long as it has electrical conductivity without causing chemical changes in the battery. Examples of the conductive material may suitably include graphite such as natural graphite or artificial graphite; carbon blacks such as carbon black, acetylene black, ketjen black, channel black, furnace black, lamp black and thermal black; conductive fibers such as carbon fiber and metallic fiber; metallic powders such as carbon fluoride powder, aluminum powder and nickel powder; conductive whiskers such as zinc oxide and potassium titanate, conductive metal oxides such as titanium oxide; polyphenylene derivatives; and the like.

The graphite-based material having elasticity may suitably be used as the conductive material, and may suitably be used together with the above materials.

The binder may promote binding between the active material and the conductive material and in binding to the current collector, may suitably be added in an amount of about 1 to 50 wt % based on a total weight of the mixture including the cathode active material. Examples of the binder may suitably include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, and the like.

The filler may be optionally used as a component to inhibit expansion of the electrode. The filler is not particularly limited as long as it is a fibrous material that does not cause chemical changes in the battery. For example, olefin-based polymers such as polyethylene and polypropylene; and fibrous materials such as glass fiber and carbon fiber may suitably be used.

The anode includes a current collector and an anode active material layer formed on the current collector, and the anode active material layer may include an anode active material.

The anode active material may suitably include one or more selected from the group consisting of a carbon-based anode active material, lithium metal, a lithium alloy, Si, $SiO_x$ (0<x<2), a Si—C composite, a Si-Q alloy (Q is an alkali metal, an alkaline earth metal, a Group 13 to Group 16 element, a transition metal, a rare earth element or a combination thereof, except Si), Sn, $SnO_2$, a Sn—C composite, a Sn—R alloy (R is an alkali metal, an alkaline earth metal, a Group 13 to Group 16 element, a transition metal, and a rare earth element. The active material may not include a mixture formed by adding Sn.

The anode current collector may suitably be formed to have a thickness of about 3 to 500 μm. The anode current collector is not particularly limited as long as it has electrical conductivity without causing chemical changes in the battery. For example, the anode current collector may suitably include one or more of copper; stainless steel; aluminum; nickel; titan; sintered carbon; copper or stainless steel surface-treated with carbon, nickel, titan or silver; an aluminum-cadmium alloy; or the like. Further, similarly to the cathode current collector, the anode current collector may form fine irregularities on its surface to increase adhesive force of the anode active material, and various forms such as a film, a sheet, a foil, a net, a porous body, a foam body, and a nonwoven fabric body may suitably be used.

The lithium secondary battery according to various exemplary embodiments of the present invention may be a lithium ion battery, a lithium ion polymer battery, or a lithium polymer battery, which may include various types of the electrolyte and/or the separator typically used in the related arts.

When the lithium secondary battery is a lithium ion battery using a liquid electrolyte, the liquid electrolyte may be impregnated into the separator. The separator is interposed between the cathode and the anode, and an insulating thin film having high ion permeability and mechanical strength is used. The pore diameter of the separator may suitably range from about 0.01 to 10 μm and the thickness may suitably range from about 5 to 300 μm. The separator may suitably include a sheet or a nonwoven fabric made of an olefin-based polymer such as polypropylene, which is chemically resistant and hydrophobic, glass fiber, polyethylene, or the like. When a solid electrolyte such as a polymer is used as the electrolyte, the solid electrolyte may also serve as a separator.

The liquid electrolyte may be a non-aqueous electrolyte containing a lithium salt. The non-aqueous electrolyte containing a lithium salt may suitably include a non-aqueous electrolyte and lithium. Examples of the non-aqueous electrolyte may suitably include a non-aqueous organic solvent, an organic solid electrolyte, an inorganic solid electrolyte, and the like, but are not limited thereto.

Examples of the non-aqueous organic solvent may suitably include, but not be limited to, non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte may suitably include, but not be limited to, polyethylene derivatives, polyethylene oxide derivatives, polypropylene oxide derivatives, phosphoric acid ester polymers, polyagitation lysine, polyester sulfide, polyvinyl alcohols, polyvinylidene fluoride, polymers containing a secondary dissociation group, and the like.

Examples of the inorganic solid electrolyte may suitably include, but not be limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

The lithium salt may be soluble in the non-aqueous electrolyte and examples thereof may suitably include, but not be limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, lithium imide, and the like.

The non-aqueous electrolyte containing a lithium salt may suitably include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, in order to improve charge-discharge characteristics and flame retardancy, and the like. In some cases, a halogen-containing solvent such as carbon tetrachloride and ethylene trifluoride may be further added to give nonflammability, or carbon dioxide gas may be further added to improve high-temperature storage characteristics. Other additives, for example, FEC (Fluoro-Ethylene Carbonate), PRS (Propene sultone), and the like may be further added thereto.

The lithium salt such as $LiPF_6$, $LiClO_4$, $LiBF_4$, $LiN(SO_2CF_3)_2$, and the like may be added to a mixed solvent of a cyclic carbonate such as EC and PC, which is a high-dielectric solvent, and a linear carbonate such as DEC, DMC and EMC, which is a low-viscosity solvent, to prepare a non-aqueous electrolyte containing a lithium salt.

The lithium secondary battery according to various exemplary embodiments of the present invention may be implemented as a battery module including the same as a unit cell, a battery pack including the battery module, and a device including the battery pack as a power source.

Examples of the device may include an electric vehicle, a hybrid electric vehicle, a plug-in hybrid electric vehicle, or a power storage system, but is not limited thereto.

According to the present invention, a cathode additive of a lithium secondary battery may suppress generation of oxygen gas or gelation of an electrode slurry composition, which may occur due to a small residual amount of by-products such as lithium oxide, and may have improved crystallinity.

Thus, the lithium secondary battery including the cathode additive may overcome the irreversible capacity loss of the anode material while exhibiting higher capacity characteristics even with use of the anode material having high energy density. In addition, the performance deterioration of the battery due to by-products may be reduced, thereby exhibiting excellent lifetime characteristics and capacity characteristics.

EXAMPLES

Hereinafter, the function and effect of the present invention will be described in more detail through specific examples of the present invention. However, these examples are for illustrative purposes only, and the invention is not intended to be limited by these examples.

Example 1

60 g of $Li_2O$ as a raw material for lithium and 150 g of CoO as a raw material of cobalt were mixed and then heat-treated and calcined at a temperature of 550° C. for 18 hours under a nitrogen atmosphere.

Thereafter, 7.14 g of ammonium phosphate was further added to the product, followed by heat-treatment and calcination at a temperature of 685° C. for 18 hours under a nitrogen atmosphere. The product was cooled down to obtain cathode additive particles.

Example 2

60 g of $Li_2O$ as a raw material for lithium and 150 g of CoO as a raw material of cobalt were mixed and then heat-treated and calcined at a temperature of 550° C. for 18 hours under a nitrogen atmosphere.

Thereafter, 2.73 g of ammonium phosphate was further added to the product, followed by heat-treatment and calcination at a temperature of 685° C. for 18 hours under a nitrogen atmosphere. The product was cooled down to obtain cathode additive particles.

Example 3

60 g of $Li_2O$ as a raw material for lithium and 150 g of CoO as a raw material of cobalt were mixed and then heat-treated and calcined at a temperature of 550° C. for 18 hours under a nitrogen atmosphere.

Thereafter, 18.06 g of ammonium phosphate was further added to the product, followed by heat-treatment and calcination at a temperature of 685° C. for 18 hours under a nitrogen atmosphere. The product was cooled down to obtain cathode additive particles.

Comparative Example 1

60 g of $Li_2O$ as a raw material for lithium and 150 g of CoO as a raw material of cobalt were mixed and then heat-treated and calcined at a temperature of 550° C. for 18 hours under a nitrogen atmosphere. The product was cooled down to obtain cathode additive particles.

Experimental Example 1: Analysis of a Cathode Additive

X-ray diffraction (XRD) analysis using Cu Kα X-ray (X-rα) was performed on the cathode additive particles prepared in Examples 1 to 3 and Comparative Example 1, and the results of Example 1 and Comparative Example 1 are shown in FIG. 2. For this XRD analysis, a XRD analysis equipment from Bruker (product name: D4 Endeavor) was used.

As shown in top/bottom graph of FIG. 2, Example 1 had a second peak at 2θ of 22.42±0.5°, 24.84±0.5° or 34.88±0.5°, and the second peak has an intensity of 10% or less, based on an intensity of the peak at 2θ of 23.5°±0.2°. Particularly, $Li_aM_bO_c$ was included in the cathode additive of Example 1, and the entire cathode additive had a single complex form.

Figure 3A:
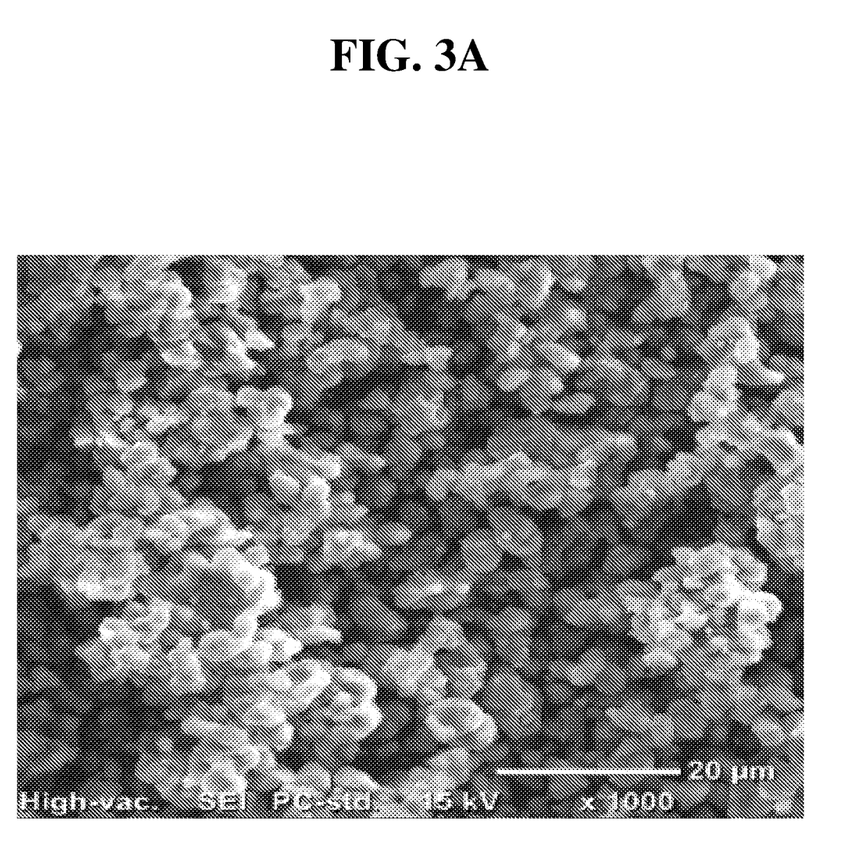
FIG. 3A and FIG. 3B are photographs analyzed by Fe-SEM for an exemplary cathode additive particles of Example 1 and exemplary particles obtained by forming $Li_aM_bO_c$ ($Li_3PO_4$) alone in Experimental Example 1.
Figure 3B:
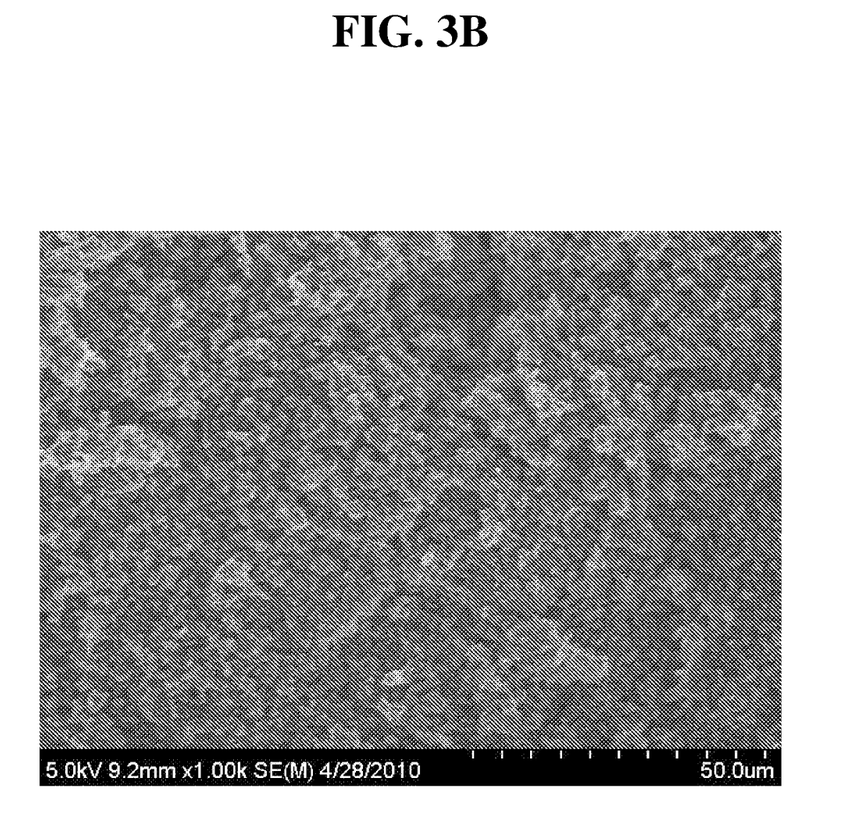

In addition, the cathode additive particles of Example 1 were analyzed by Fe-SEM photograph and shown in FIG. 3A. For comparison, particles obtained by forming $Li_aM_bO_c$ ($Li_3PO_4$) alone were analyzed by Fe-SEM photograph and shown in FIG. 3B. As shown in FIG. 3A, particles of each component were physically mixed and connected to each other to exist as an aggregated single particulate such as a secondary particle, unlike the case where $Li_6Co_{1-x}M_xO_4$ and $Li_aM_bO_c$ were separately prepared and mixed (FIG. 3B). The cathode additive of Example 1 had a single complex form in general.

A cathode was prepared using the cathode additive particles prepared in Examples 1 to 3 and Comparative Example 1, and then X-ray diffraction (XRD) analysis was performed at various voltages.

The cathode additive prepared in Examples 1 to 3 or Comparative Example 1, a carbon black conductive material and a PVdF binder were mixed in a weight ratio of 85:10:5 in N-methylpyrrolidone solvent to prepare a composition for forming a cathode. This composition was applied to an aluminum current collector, followed by drying and rolling. Li-metal was used as an anode, and a coin-cell type battery was manufactured using an electrolyte containing 1.0 M of $LiPF_6$ in a solvent having a mixing volume ratio of EC:DMC:DEC=1:2:1.

The prepared battery was charged to a predetermined voltage at 0.1 C and 25° C., and then the cathode was separated and subjected to XRD analysis.

As a result of the analysis, the peak of unreacted lithium oxide ($Li_2O$) was clearly identified in Comparative Example 1, and a relatively large amount of by-products were contained. And the content of the residual lithium oxide was estimated to be about 21.0 wt %. In contrast, the cathode additive of Examples 1 to 3 had substantially no peak of unreacted lithium oxide ($Li_2O$), and the content of by-products was minimized, which was estimated to be about 5 wt % or less (Example 1: 2.9 wt %).

The composition of the cathode additives of Examples and Comparative Example was quantitatively calculated from the XRD results analyzed by the above-mentioned method, and the results are shown in Table 1 below.

TABLE 1

|  | The molar ratio of $Li_6Co_{1-x}M_xO_4:Li_aM_bO_c(Li_3PO_4)$ (y:z) | Type of M and the content (x) |
|---|---|---|
| Example 1 | 25:1 | P (x = 0.039) |
| Example 2 | 60:1 | P (x = 0.015) |
| Example 3 | 9:1 | P (x = 0.01) |
| Comp. Example 1 | 1:0 | None |

As shown in Table 1 above, the cathode additives of Examples 1 to 3 satisfied the composition of Chemical Formula 1.

Experimental Example 2: A Charge-Discharge Test—Measurement of Irreversible Capacity The cathode additive prepared in Example 1, an acetylene black conductive material and a PVdF binder were mixed in a weight ratio of 85:10:5 in N-methylpyrrolidone solvent to prepare a composition for forming a cathode. This composition was applied to an aluminum current collector, followed by drying and rolling to prepare a cathode. A Li-metal anode and a PE separator were used to manufacture a coin half-cell type battery.

The battery was charged to 4.25 V, and then discharged to 2.5V to obtain a charge-discharge profile. This is shown in FIG. 4.

Figure 4:
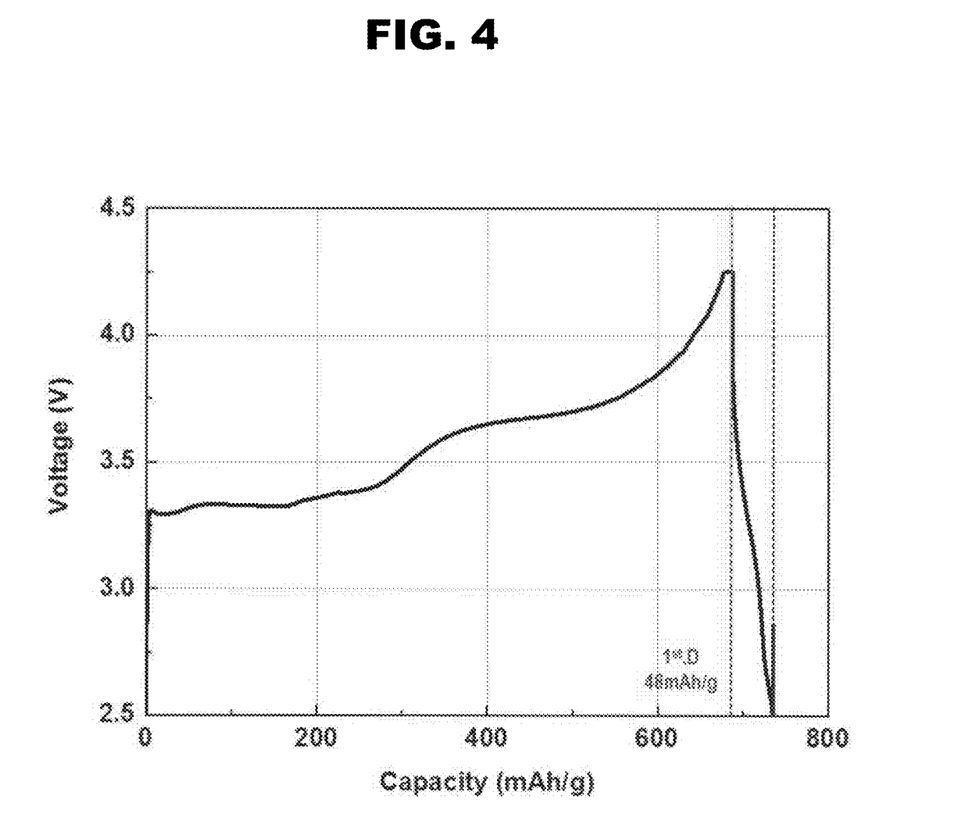
FIG. 4 is a graph showing a charge-discharge profile of an exemplary cathode additive obtained in Example 1 according to an exemplary embodiment of the present invention by a charge-discharge test.

Referring to FIG. 4, it was confirmed that the cathode additive of Example 1 exhibited high irreversible capacity.

Experimental Example 3: Evaluation of Oxygen Gas Generation

The cathode additive prepared in Example 1 and Comparative Example 1, a cathode active material of $Li(Ni_{0.8}Co_{0.1}Mn_{0.1})O_2$, an acetylene black conductive material and a PVdF binder were mixed in a weight ratio of 5:80:10:5 in N-methylpyrrolidone solvent to prepare a composition for forming a cathode. This was applied to an aluminum current collector, followed by drying and rolling to prepare a cathode. A Li-metal anode and a PE separator were used to manufacture a coin half-cell type battery.

The battery was charged to 4.25 V and stored at 60° C. for 6 weeks. In this experiment, the amount of generated oxygen gas when using the additive of Example 1 and Comparative Example 1 was evaluated using a volumetric method with the principle of Archimedes. The results are shown in FIG. 5.

Figure 5:
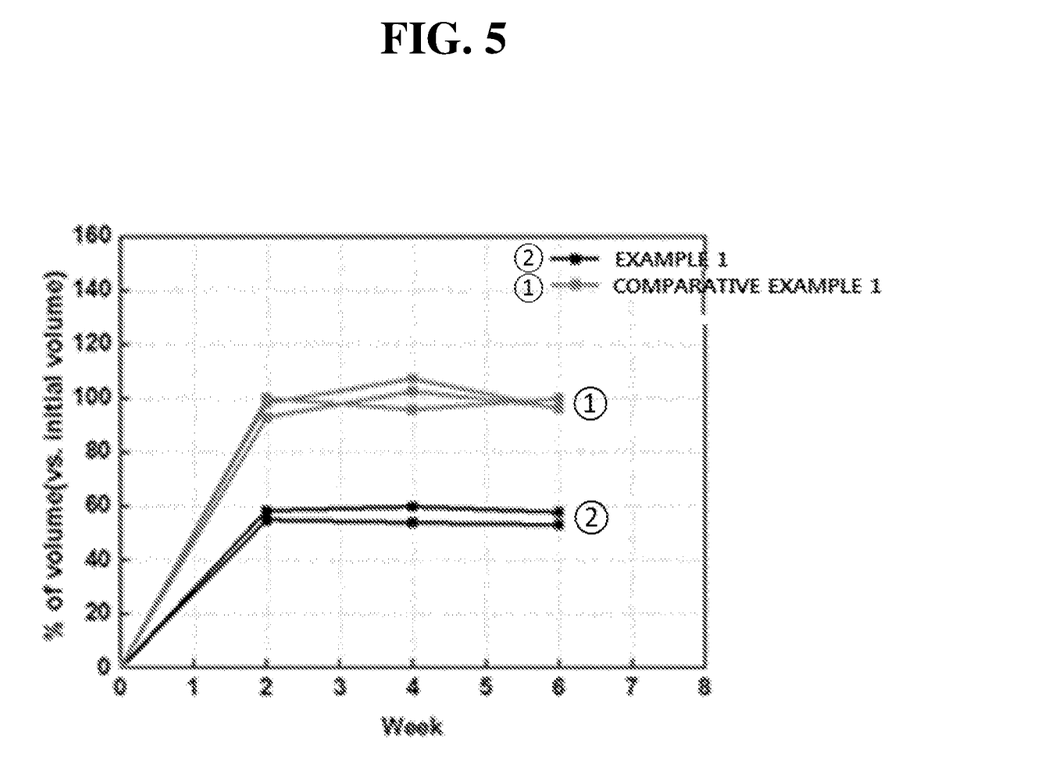
FIG. 5 is a graph showing evaluation results of an amount of oxygen gas generated during storage after charging in Experimental Example 3 for an exemplary battery prepared by using an exemplary cathode additive obtained in Example 1 according to an exemplary embodiment of the present invention and Comparative Example 1 together with an exemplary cathode active material.

As shown in FIG. 5, the amount of oxygen gas generated during storage after charging was reduced in the case of using the cathode additive of Example 1, compared with the case of using the cathode additive of Comparative Example 1.

The aforementioned exemplary embodiments are merely illustrative but are construed as limiting the present invention. The scope of the present invention is represented by the claims below rather than the detailed description, and the meaning and scope of the claims and all modifications or variations derived from equivalents thereof are intended to be incorporated within the scope of the present invention.

The invention claimed is:

1. A cathode additive for a lithium secondary battery, comprising a composite comprising ($Li_6Co_{1-x}M_xO_4$) and ($Li_aM_bO_c$), wherein M comprises one or more elements selected from the group consisting of P, B, F, W, and Zr;

$0.1 \leq a \leq 6$, $1 \leq b \leq 5$, $1 \leq c \leq 8$; and $0 \leq x < 1.0$;

wherein the composite is present in a form of a single particulate or a complex.

2. The cathode additive of claim 1, wherein the composite is represented by the following Chemical Formula 1:
[Chemical Formula 1] $y(Li_6Co1-xM_xO_4)-z(Li_aM_bO_c)$
wherein y and z are molar ratios of $Li_6Co_{1-x}M_xO_4$ and $Li_aM_bO_c$ contained in the composite of Chemical Formula 1, and y:z is about 2:1 to 60:1, each of a, b and c is independently an integer of 1 or greater, and is determined within a range satisfying the following Equation 1: [Equation 1] (oxidation number of Li×a)+(oxidation number of element M×b)+(oxidation number of O×c)=0.

3. The cathode additive of claim 1, wherein the composite comprises the $Li_6Co_{1-x}M_xO_4$ and the $Li_aM_bO_c$ physically mixed and attached to each other.

4. The cathode additive of claim 1, wherein the composite has a second peak at 2Θ of 22.42±0.50°, 24.84±0.5° or 34.88±0.5° in XRD (X-ray diffraction) analysis by Cu Kα X-ray (X-rα), and
an intensity of the second peak is about 10% or less based on an intensity of a first peak at 2Θ of 23.5±0.5°.

5. The cathode additive of claim 1, wherein the composite further comprises $Li_2O$ in an amount of about 5 wt % or less based on the total amount of the composite.

\* \* \* \* \*